United States Patent
Schofield

(10) Patent No.: US 11,785,954 B2
(45) Date of Patent: Oct. 17, 2023

(54) COMPOSITION AND PROCESS FOR A ONE MINUTE FRESH BAKED COOKIE

(71) Applicant: Richard Schofield, Redding, CA (US)

(72) Inventor: Richard Schofield, Redding, CA (US)

( * ) Notice: Subject to any disclaimer, the term of this patent is extended or adjusted under 35 U.S.C. 154(b) by 0 days.

(21) Appl. No.: 17/245,954

(22) Filed: Apr. 30, 2021

(65) Prior Publication Data

US 2021/0337814 A1 Nov. 4, 2021

Related U.S. Application Data

(60) Provisional application No. 63/019,397, filed on May 3, 2020.

(51) Int. Cl.
*A21D 13/28* (2017.01)
*A21D 13/24* (2017.01)
(Continued)

(52) U.S. Cl.
CPC .............. *A21D 13/28* (2017.01); *A21B 2/00* (2013.01); *A21D 13/24* (2017.01); *A21D 13/80* (2017.01);
(Continued)

(58) Field of Classification Search
CPC ........ A21D 13/10; A21D 13/13; A21D 13/16; A21D 13/17; A21D 13/20; A21D 13/22; A21D 13/24; A21D 13/26; A21D 13/28; A21D 13/80; A21D 17/00; A21D 17/002; A21D 17/004; A21D 17/006; A21D 13/11; A21D 13/44; A21D 15/08; A23L 5/15;
(Continued)

(56) References Cited

U.S. PATENT DOCUMENTS 3,767,089 A * 10/1973 McKee .................... A21C 9/04
222/221
3,983,256 A * 9/1976 Norris ...................... A21B 3/13
426/94
(Continued)

FOREIGN PATENT DOCUMENTS

JP 2005027564 A * 2/2005

OTHER PUBLICATIONS

Arias, Tessa; Thin and Crispy Chocolate Chip Cookies; Handle the Heat; Jan. 24, 2019, https://handletheheat.com/thin-crispy-chocolate-chip-cookies/ (Year: 2019).*

(Continued)

*Primary Examiner* — Drew E Becker
*Assistant Examiner* — Austin Parker Taylor

(57) ABSTRACT

Disclosed herein is a composition comprising two edible components, one being a previously-baked but no-longer-fresh product such as a packaged cookie, the other being a high-concentration sugar solution such as a syrup, the two components being combined in a prescribed ratio and geometrical configuration such that when processed by heating in a microwave oven for a prescribed time, said time being typically less than 30 seconds, the enhanced cookie so produced has the superior taste, smell and mouthfeel of a (Continued)

fresh oven-baked cookie, thereby allowing the rapid production of such enhanced cookies one at a time or a few at a time for personal consumption, or on-demand in a fast-food service environment.

11 Claims, 1 Drawing Sheet

(51) Int. Cl.
    *A23L 5/10*     (2016.01)
    *A21B 2/00*     (2006.01)
    *A21D 13/80*     (2017.01)
    *A23G 3/34*     (2006.01)

(52) U.S. Cl.
    CPC .............. *A23G 3/0048* (2013.01); *A23L 5/15* (2016.08); *A23V 2002/00* (2013.01)

(58) Field of Classification Search
    CPC .... A23L 5/30; A23L 5/34; A21B 2/00; A23G 3/0048–0055; A23G 3/0063; A23G 3/0089; A23G 3/0091–0097; A23G 3/04–125; A23G 3/20; A23G 3/2092–28; A23G 3/343; A23G 3/54; A23P 20/00; A23P 20/10; A23P 20/15; H05B 6/64; H05B 6/687; H05B 6/782

USPC ................ 426/103, 302, 305, 307, 310, 391
See application file for complete search history.

(56) References Cited

U.S. PATENT DOCUMENTS

| | | | | |
|---|---|---|---|---|
| 4,911,939 | A * | 3/1990 | Lou ..................... | A21D 13/00 426/243 |
| 4,927,645 | A * | 5/1990 | Lee ..................... | A23L 7/191 426/660 |
| 4,948,602 | A * | 8/1990 | Boehm ................. | A21D 13/37 426/243 |
| 6,562,385 | B2 * | 5/2003 | Neumann ............. | A21D 13/31 426/94 |
| 6,861,082 | B2 * | 3/2005 | Laffont ................ | A23G 9/14 426/244 |
| 2006/0008575 | A1 * | 1/2006 | Armbrecht ........... | A23G 3/343 426/659 |
| 2012/0009299 | A1 * | 1/2012 | Xie ..................... | A21D 17/006 426/243 |

OTHER PUBLICATIONS

Natasha's Kichen; Jam Filled Sandwich Cookies (Zirochki); Feb. 11, 2014; https://natashaskitchen.com/jam-filled-sandwich-cookies-zirochki/ (Year: 2014).*

* cited by examiner

COMPOSITION AND PROCESS FOR A ONE MINUTE FRESH BAKED COOKIE

REFERENCE TO RELATED APPLICATIONS

This application claims an invention which was disclosed in Provisional Application No. 63/019,397, filed May 3, 2020, entitled "Composition and Process for a One-Minute Fresh-Baked Cookie". The benefit under 35 USC § 119(e) of the United States provisional application is hereby claimed, and the aforementioned application is hereby incorporated herein by reference.

FIELD OF THE INVENTION

The present invention relates to a food product that can be prepared commercially, or by a consumer, utilizing shelf-stable ingredients to produce a cookie that has characteristics of a freshly oven-baked cookie, such production taking less than about a minute utilizing a microwave oven.

BACKGROUND OF THE INVENTION

Cookies are a $2-billion industry in the US and are popular around the world. Almost everyone prefers fresh-baked cookies, but the time and effort to make a batch of cookies can be prohibitive, especially when compared to the immediacy and simplicity of opening a store-bought package of cookies from the cupboard. Even if someone bakes a few dozen cookies in a batch, unless there is a large gathering, the majority of them will not be eaten during the window of time (3 to 4 hours at most) when they have that fresh-baked taste, aroma and mouthfeel. The majority will be stored in a container, and slowly grow stale as the supply is gradually consumed over a number of days.

There currently exists no way to return an off-the-shelf cookie to its fresh-baked state. Reheating in the oven will result in a dry, over-cooked cookie. Heating in the microwave can partially restore a cookie's freshness, but it does not produce a true fresh-baked quality when it comes to aroma, taste and mouthfeel.

There also currently exists no way to produce cookies of acceptable quality from dough by baking them in a microwave oven. Such efforts always result in an inferior cookie, without the caramelization and flavor/aroma profiles developed at oven-baking temperatures. Microwave-baked cookies lack the "sizzle" of a fresh oven-baked cookie, and can at best be described as warm and moist and sometimes chewy. While these characteristics may be pleasant, they are far inferior to the sizzle everyone craves from a fresh-baked cookie. The sizzle derives from the caramelization and thin crust that forms on the bottom of the cookies caused by the cookie sheet or tray attaining temperatures in excess of 300° F. This is the primary contributor to the aroma, flavor and mouthfeel of fresh-baked cookies. Such temperatures simply do not occur when cooking cookie dough in a microwave oven.

With microwave ovens being inadequate to the task, there currently exists no way to prepare a single cookie with characteristics of a fresh oven-baked cookie in under a minute. The present invention solves this problem.

Others have tried in the past to create recipes and methods to rapidly produce cookies with characteristics of fresh-baked cookies, but none have succeeded with the speed and quality of the present invention. More importantly, none have disclosed any compositions or processes that are relevant to or preempt the present invention's novel composition and process.

In U.S. Pat. No. 6,093,437, Katta et al. disclose a method of forming a cookie with characteristics that allow it to be quickly reheated in a toaster or similar device without burning, dripping or losing structural integrity. This approach fell short in two regards. First, the toasting time was over two minutes, compared to a microwaving time of under 30 seconds for the present invention. Second, and more importantly, the toasted cookie itself did not reach the temperature ranges typically encountered in baking, and did not produce the flavors, aromas and mouthfeel of a fresh-baked cookie. Rather, the patent disclosed that the cookies attained an "appearance" very similar to a fresh-baked cookie. While this patent addresses the same problem, neither its composition nor its process (heating in a toaster) preempts the present invention.

In U.S. Pat. No. 4,911,939, Lou et al. disclose a shelf-stable, parbaked (partially baked) cookie with characteristics intended for it to be finished in a microwave oven, with best results obtained using a susceptor material to produce enough localized heat to brown the surface. Susceptor materials are typically thin foils that absorb microwaves and produce locally high temperatures capable of browning the food surfaces that contact them. Lou reported achieving the taste and texture of a fresh-baked cookie in about 45 seconds, however the result was a cookie with a moist, smooth and soft texture, not the sizzle that is desired. Again, it is unlikely that high enough temperatures (>300° F.) were attained to a sufficient extent to induce the chemical reactions that occur during baking. While this patent discloses use of a microwave oven process similar to the present invention, its composition (a parbaked cookie) in no way preempts the present invention.

In U.S. Pat. No 5,204,131, Frattinger et al. disclose a cookie dough additive that results in microwaved cookies that have a soft, chewy, fresh, home baked texture. The required cooking time is 85 to 110 seconds which is acceptable, however the result was still typical of microwaved dough-based products, without the sizzle of a fresh-baked cookie. While this patent discloses use of a microwave oven process similar to the present invention, its composition (a unique cookie dough) in no way preempts the present invention.

The present invention imparts a true fresh-baked taste, smell and mouthfeel, creating this sizzle by producing localized temperatures in excess of 300° F. for sufficient time and at sufficient power to "bake" the cookie in the microwave oven. And it does so without susceptor materials. It in some ways makes an even better taste and mouthfeel than the original cookie, through a small amount of added sweetness and extra caramelization. Furthermore, it does so with a microwave cooking time of under 30 seconds, and a total preparation time of under a minute, utilizing commercially producible, shelf-stable ingredients.

This invention utilizes a combination of a composition (the "Composition") and a process (the "Process"), neither of which—alone—represents the present invention. One exemplary embodiment of the novel Composition described herein consists of two components: a cookie, and a sugar syrup. Both the cookie component and the sugar syrup component can be fulfilled with readily available consumer products, each of which may be shelf-stable. Furthermore, the only equipment required for the Process described herein is a standard microwave oven and a microwave-safe plate, both of which are typically available in any household or food-preparation business.

BRIEF SUMMARY OF THE INVENTION

In the present invention, a small, prescribed amount of concentrated sugar syrup is spread on the top of a low moisture cookie (such as might be described as "crispy"), and the Composition so formed is Processed by heating in a microwave oven for typically 15 to 25 seconds. The syrup absorbs most of the microwave energy, and quickly boils off most of its water, attaining temperatures above 300° F. The cookie is also warmed by the microwaves, but it is the heat from the bubbling syrup that causes caramelization and the "baking" effect on the top surface of the cookie. The resultant cookie has the smell, taste and mouthfeel of a fresh-baked cookie, and can be consumed as soon as it has cooled enough to safely handle (usually under two minutes).

DETAILED DESCRIPTION

Figure 1:
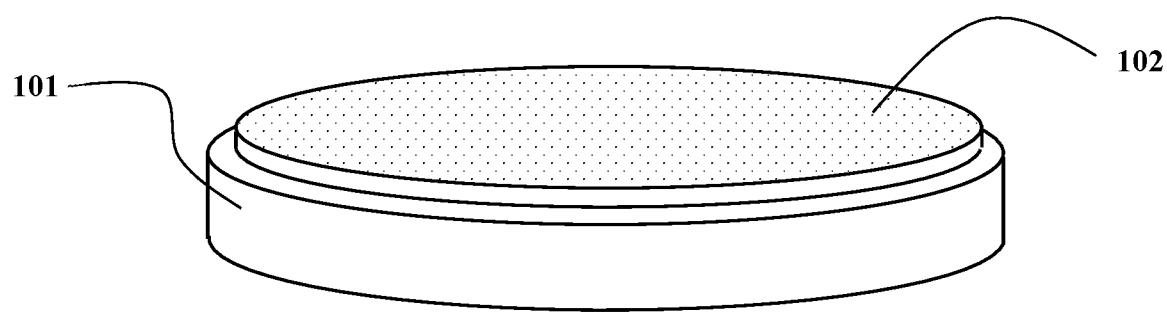
FIG. 1 is an idealized geometry of the Composition of the present invention

In its broadest sense, the present invention provides a Composition of matter and a Process to enhance potentially any low-moisture food product in a microwave oven while imparting an oven-baked quality above and beyond what microwaving alone can produce. Ideally, this invention works best to rejuvenate solid foods with less than 6% water content. Baked goods, particularly sweet ones, are found to be exemplary, as this invention restores the fresh-baked quality by attaining localized temperatures in excess of 300° F. (150° C.) inducing the caramelization of sugars in the Composition, just as occurs in oven-baking. The food product (e.g., cookie) to be reheated and enhanced by this invention, can be more-or-less homogeneous, such as a sugar cookie, or can be composite in nature, such as a chocolate chip cookie or white-chocolate macadamia-nut cookie.

Composition

The Composition of matter that is the subject of this invention, again in its broadest sense, has two primary components, hereinafter referred to as "Component A" and "Component B".

Component A is the food to be reheated and enhanced (e.g., a cookie), and represents the majority of the Composition. Component A preferably contains less than about 6% water content by weight, with 4 wt. % or less being ideal. If more water is present, the Process does not achieve the required temperature to attain the desired result, as will be described.

Component A is preferably in a portion size of a small, single serving of between 10 grams and 40 grams when used with a domestic microwave oven under 1,200 Watts, or 20 to 80 grams with a higher-powered commercial microwave oven (e.g., 2,000 W). It is preferably thin and flat, with a more-or-less flat upper surface.

A modest-sized chocolate chip cookie is ideal, and much of the following discussion will focus on that as an exemplary food component for Component A. In order to be an excellent candidate, a cookie should most likely bear a descriptor such as "crunchy" or "crispy" (meaning low-moisture content, e.g., under 6% water by weight) rather than a descriptor of "moist" or "chewy" (indicating, say, 6% to 12% water).

Component A typically, and critically, represents about 75 to 90 wt. % of the material present in the Composition of this invention at the beginning of the Process (defined later), and typically ends up being about 90 to 95 wt. % of the final product Composition, although these ranges can be intentionally varied to produce different desirable results.

Component B is an edible component such as a syrup, paste or gel, that itself comprised two essential subcomponents—Component B-1 and Component B-2. It may also include any number of non-essential minority components (provided they do not interfere with the Process).

Component B-1 is water, and should be present in the amount of typically 30 to 60 wt. % of Component B, with 40 wt. % being ideal. The fact that the water content of Component B is an order of magnitude higher than the water content of Component A is germane to the present invention.

Component B-2 is theoretically any water-soluble compound (or aggregate of compounds) that meets the following three properties: 1) it is an edible food product that is preferably pleasant tasting; 2) it is very highly soluble in water; and 3) it imparts significant vapor pressure reduction, so much so that the boiling point of Component B is significantly higher than the boiling point of water when Component-B-2's concentration is very high. Such "vapor pressure reduction" (or "boiling point elevation") is a colligative property, and in aqueous solutions it can be quite significant for many salts and organic compounds. The exemplary choice for the present invention is the group of compounds known as sugars (for example, sucrose or white sugar, $C_{12}H_{22}O_{11}$).

Many specific sugars or compound sweeteners exhibit sufficient boiling point elevation to have utility in the present invention. These include sucrose, glucose, fructose, invert sugar, and high-fructose corn syrup, to name a few. In order to have broad utility in the present invention, Component B-2 should be edible and approved for human consumption by any relevant authority. For the remainder of this discussion, the single or plural components that comprise Component B-2 will henceforth be referred to collectively as "Sugars".

Component B has a physical requirement as well. It must be flowable or spreadable; and if flowable, it must be thixotropic or be viscous enough to stay in place for at least several seconds. A viscosity in excess of about 2,000 mPas (being equivalent to 2,000 Centipoise or 2 Pascal-seconds) is preferred, although viscosities as low as about 500 mPas can be effective. Example food products that could be used as Component B include honey, molasses, maple syrup, and caramel syrup (as might be used as an ice cream topping or coffee flavor additive). Component B may contain thickeners, such as starches, and other flavor compounds in minor amounts, but should mostly be comprised of water and Sugars.

Component B should typically make up 10 to 25 wt. % of the initial Composition within the present invention, and will typically end up being closer to 5 to 10% of the final Composition by weight, as most of the water content of Component B will evaporate during the microwave heating Process. This evaporation is by design, and is germane to the present invention.

The Composition disclosed here has geometric requirements as well as componential requirements. While many geometries will have utility, an idealized geometry is shown in FIG. 1.

With reference to FIG. 1, the ideal geometry for the Composition disclosed here is as follows. Component A 101, which is ideally solid, lies flat on a flat surface, while Component B 102, which is ideally a viscous liquid, gel or paste, is arranged immediately on top of Component A, in intimate contact with the upper surface of Component A. The Composition would ideally comprise 12 to 20% Component B by weight (5 to 10% by volume), with some utility in the range 10 wt. % to 25 wt. %.

While any planar shape will work for the geometry of Component A, such as a square, oval or freeform shape, a circular shape is shown in FIG. 1 as ideal. While the height of Component A may be variable and its upper surface undulating, a constant height and flat surface is shown in FIG. 1 as ideal. While the present invention may have some utility with greater height-to-width ratios than shown for Component A 101 in FIG. 1, best results are obtained if the average height is 5% to 20% of the average horizontal dimension, with this height-to-width ratio being ideal in the range 8% to 16%.

Figure 2:
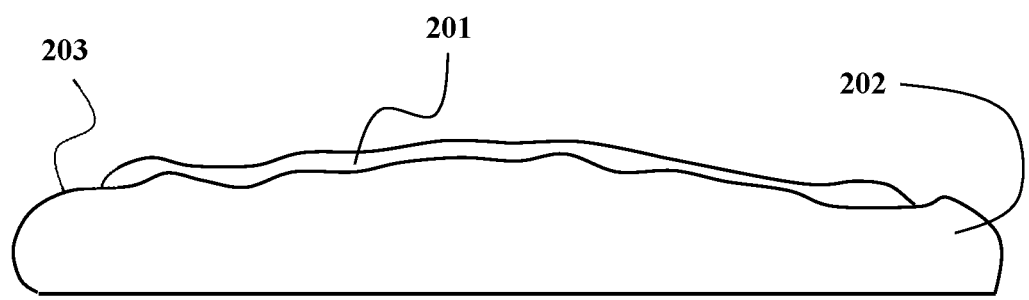
FIG. 2 is an exemplary Composition cross-section of a sugar syrup coated on top of a cookie.

Component B 102, being a viscous liquid, gel or paste, is distributed more-or-less evenly on the upper surface (flat or undulating) of Component A 101. A more realistic cross-section is shown in FIG. 2, depicting, for example, caramel syrup 201 spread over the top of a chocolate chip cookie 202.

Component B should, to the degree practicable, more-or-less evenly cover the majority of the surface of Component A, however a gap may be left around the edges 203, as there will be some outward migration of Component B during the heating Process. Uneven distribution of Component B can be tolerated quite broadly, as this component will bubble and boil, redistributing itself as it does.

Process

The "Process" of the present invention is to heat the Composition in a microwave oven for a predetermined amount of time to achieve a desired outcome. This time will depend on 4 primary factors:
1. The power rating (Wattage) of the microwave oven;
2. The weights of Component A and Component B
3. The water-content levels of Component A and Component B
4. The target degree of "doneness".

Consider, for example, the following scenario:
Factor 1: The microwave oven is rated at 750 Watts.
Factor 2: Component A is a 14-gram chocolate chip cookie, and Component B is 2 ml (2.6 grams) of thick caramel syrup.
Factor 3: Component A contains about 3 wt. % water, and Component B contains about 40 wt. % water.
Factor 4: The target outcome (doneness) is a hot, slightly chewy cookie with softened chocolate chips and notes of fresh caramel—described here as a "medium" level of doneness.

From experimental results, the above scenario requires about 20 seconds in the microwave oven. During this time, Component B will begin to bubble and boil at about 5 seconds, will be boiling profusely by 10 seconds, and will continue to bubble and reduce in volume with some slight browning through to the 20-second mark.

To understand how the factors interrelate, consider two more scenarios.
(1) The same desired outcome (Factor 4) using a 1,000-Watt microwave oven (Factor 1), all else being equal, might take, for example:
750 W/1000 W=0.75 times as long, being 15 seconds rather than 20 seconds, reflecting the more powerful microwave oven.
(2) The same outcome (Factor 4) for a 600-Watt microwave oven (Factor 1) and a larger cookie with 20% more weight of Components A and B (Factor 2), with Factor 3 remaining the same might take, for example:
(750 W/600 W)×(1+20%)=1.5 times as long, being 30 seconds, reflecting the larger cookie and less powerful microwave oven.

Most of the highest-quality-result scenarios, as prescribed by this invention, will take 30 seconds or less of cooking time in the microwave oven, and almost all practical and beneficial scenarios will be accomplished in 15 to 25 seconds of cooking time.

Obviously, there are other steps in the overall preparation process, including assembly of the Composition, plating it on a microwave-safe plate, placing it in the microwave oven, and optionally cooling it until it can be safely and easily handled, but these are considered common sense, and are not claimed as part of the Process in this invention. On the topic of cooling, "well-done" cookies should be cooled for a least a minute or two on the plate they were heated on in order to regain structural integrity and prevent possible burns, at which point they will be gooey and hot and messy, but delectable. Within 2 to 5 minutes of cooling, they will be stable enough to pick up and handle without undue messiness.

Combined Composition and Process

This invention is not the Composition alone. Putting sugar frosting on a toaster strudel might more-or-less fulfill the Composition requirement. This invention is not the Process alone. Thawing a frozen English muffin in a microwave oven might more-or-less fulfill the Process. It is the combination of the Composition and the Process that represents this invention. It is true that 1) heating a plain chocolate chip cookie in a microwave (the Process) may make it warm and gooey, and perhaps more enjoyable to eat than an off-the-shelf cookie, or 2) smearing a room-temperature chocolate chip cookie with caramel syrup (the Composition) may form a tasty treat; however, it is the combination of the Composition and the Process that forms a far superior product in the form of an enhanced, ostensibly "fresh-baked" cookie.

Geometry

There are three reasons for the geometric requirements of the Composition.

1. During the heating Process described above, Component B boils and bubbles profusely, and a thin, fairly even, unrestricted layer of Component B on top of Component A can do so in a controlled fashion without undue spluttering, exploding or ejecting of matter, and without it all flowing off to the sides.

2. It is desirable to evenly distribute the desired effect throughout the entire cookie, and the prescribed geometry gives ample area for the necessary heat and mass transfer to occur more-or-less evenly to the whole cookie. A taller shape or an uneven bulk distribution of Component B would not do so.

3. Steam emitted from the boiling and bubbling syrup (Component B) not only issues from its upper surface, but also diffuses downwards and condenses into the cookie (Component A), restoring the moistness of the cookie to a level closer to its original fresh-baked state. A cookie with a wide area and a shallow depth to penetrate is advantageous in this regard.

The flatter the upper surface of Component A, the better the result and the less likelihood that Component B will flow off the edges during the heating Process. To this end, it can sometimes be desirable to turn the cookie upside-down, so its flat bottom is exposed as the upper surface of Component A. Furthermore, the underside of a cookie often has larger surface pores than the top side, meaning that in this inverted-cookie scenario, some of the syrup will penetrate into these now-exposed pores, yielding a slightly different and sometimes beneficial result.

Preferred Embodiment

A. Composition

In a preferred embodiment, Component A is a single, modestly-sized, low-moisture chocolate-chip cookie and Component B is a highly viscous, high-concentration caramel syrup. Items that meet the basic requirements of these two components can be easily procured from products already on the market. Each of these may be conveniently stored in any household or in a food-preparation business such as a fast-food outlet or coffee shop. In the future, products may be produced that are specifically optimized for the Composition and Process of the present invention. This exemplary Composition comprises, for example, 2 ml (equal to about 2.6 grams) of caramel syrup drizzled or smeared on the upper surface of a single 14-gram cookie, representing a syrup-to-cookie ratio of about 16 wt. %. The viscosity of the syrup should be high enough that it stays in place, and only penetrates sparingly into the porous cookie substrate.

Of the cookies and syrups readily-available in the US, the following pairing performed particularly well.

The last row of Table 1 is the Microwave Heating Coefficient, $C_m$, defined here by Equation (1):

$$\frac{dT}{dt} = \frac{C_m P}{m} \qquad (1)$$

where: dT/dt is the rate of temperature rise, ° C./s
$C_m$ is the Microwave Heating Coefficient, ° C. g/J, or (° C./s)/(W/g)
P is the microwave power output of the oven, W
m is the mass of material being heated, g

TABLE 1

Exemplary Ingredients of the Composition

| Property | Component A: Cookie | Component B: Syrup |
|---|---|---|
| Product | Farmhouse Thin & Crispy Dark Chocolate Chip | Caramel (Puremade Sauce) |
| Brand | Pepperidge Farm | Torani |
| Main ingredients | Semi-sweet chocolate; enriched wheat flour; butter; sugar; brown sugar; eggs | Corn syrup; sugar; invert sugar; heavy cream; water; butter; nonfat milk; flavors |
| Weight per serving in Composition | 14 grams (1 cookie) | 2.6 grams (2 ml) |
| Approximate water content | 3 wt. % (totaling 0.42 g) | 40 wt. % (totaling 1.04 g) |
| Approximate density | 0.5 g/cm³ | 1.3 g/cm³ |
| Dietary calories (approx.) | 5 per gram | 4 per gram |
| Microwave Heating Coefficient, $C_m$ | 0.031 ± 0.003° C. g/J | 0.14 ± 0.01° C. g/J |

The Microwave Heating Coefficients of Components A and B in Table 1 were measured experimentally using a 750 W microwave oven.

B. Process

For the preferred embodiment of the Composition, as detailed in Table 1, the preferred Process is to plate the syrup-coated cookie on a microwave-safe plate, and microwave on high until the target or desired result is achieved. The target degree of "doneness" is quite broad (and subjective). For example, with 2.6 grams of caramel syrup on a 14-gram cookie on a paper plate with a 750 W microwave oven on full power, the results shown in Table 2 were obtained.

Discussion of Results

Table 2 provides descriptive results of the exemplary Composition and Process as a function of microwave cooking time. The "Candy Test" temperature descriptions come from the "Cold Water Test" traditionally used by candymakers. Temperatures were observed to vary across the surface of the cookie, and temperature ranges were derived from observation of the final syrup layer with reference to the Candy Test. Average temperatures of the syrup layer at different times were fitted to

TABLE 2

Results for various cooking times of the exemplary Composition

| Time (s) | Characteristics of Cookie Layer | Characteristics of Syrup Layer | Approx. Peak Syrup Temp. (° F.) | "Candy Test" (Doneness) | Resultant Final Composition |
|---|---|---|---|---|---|
| 5 | Slightly warm | Caramel begins to bubble/boil | 217 | Syrup (Underdone) | Soft warm cookie with hot gooey caramel topping |

TABLE 2-continued

Results for various cooking times of the exemplary Composition

| Time (s) | Characteristics of Cookie Layer | Characteristics of Syrup Layer | Approx. Peak Syrup Temp. (° F.) | "Candy Test" (Doneness) | Resultant Final Composition |
|---|---|---|---|---|---|
| 10 | Warm | Caramel bubbling steadily | 230 to 240 | Soft Ball (Rare) | Light, moist, fresh-baked taste and mouth-feel |
| 15 | Very warm, some loss in strength | Profuse bubbling and steaming | 270 to 290 | Soft Crack (Medium Rare) | Full fresh-baked taste, smell and mouth-feel with partially melted chocolate chips |
| 20 | Quite hot to touch, some loss in structural integrity until cooled | As above with some lateral flow | 300 to 320 | Hard Crack (Medium) | As above but with porous bubbly surface and a slightly chewy texture, with some spilling of molten syrup around the edges. |
| 25 | Hot to touch, quite low in mechanical strength until cooled | Bubbling slows down as viscosity increases, some browning | 320 to 330 | Light Caramel (Medium Well) | As above with some hints of soft and semi-hardened caramel, and fully melted chocolate chips |
| 30 | Very hot to touch, soft and moist, high loss of structural integrity until cooled | Significant reduction in volume, more browning, with bubbling subsiding | 330 to 340 | Dark Caramel (Well Done) | As above with some dark patches of heated caramelization on surface, with both chewy and crunchy toffee characteristics in localized areas. |
| >30 | Onset of burning | Minimal bubbling, turning brown | >340 | Burnt Sugar (Overdone) | Introduction of unpleasant flavors associated with burnt flour and sugar | a model of heat and mass transfer based on Equation (1), corroborating these ranges. The level of "Doneness" reported in Table 2 is descriptive only, and is subjective.

From Table 2, is can be seen that when the syrup temperature gets to about, say, 270 degrees (about 15 seconds) the resulting final Composition has been significantly enhanced with fresh-baked qualities, and its degree of doneness might be described by the term "medium rare". The fresh-baked quality, albeit subjective, of the final product continues to increase with time and temperature.

Attainment of a benchmark temperature (in the syrup phase) of 300° F. will be used as a standard of what might be considered the minimum cooking time for the product to represent "fresh baked". Any longer time, and hence higher temperature, merely shifts the taste profile from "medium" to "medium/well-done" and then to "well-done", as described in Table 2. For the exemplary Composition in Table 2, an average syrup temperature of 300° F. was attained in under 20 seconds (17.6 s according to the theoretical model).

With reference to Table 2, the reason this invention works is that Component B, the syrup, attains far-higher temperatures than Component A, the cookie. The explanation—which is the key to this invention—has three components to it.

1. The syrup (see Table 1) has a $C_m$ value of 0.14° C. g/J, which is almost 5-times higher than the cookie (0.031° C. g/J). This means that in a microwave oven, all else being equal, a gram of syrup will heat up almost 5-times as quickly as a gram of cookie. This difference in heating rate is germane to the present invention, and is a factor in deciding what food compositions are good candidates for Component B.

2. The syrup has about 13-times as much water content (on a weight-percent basis) as the cookie. From Table 1, the total amount of water in the exemplary Composition is 1.04+0.42=1.46 grams, of which 1.04 grams (71% or more than two-thirds) is in the syrup. In other words, there is more than twice as much water in the syrup as in the cookie. Since microwaves heat food primarily by imparting vibrational energy to the water molecules in the food, the syrup can be assumed to initially absorb more than twice as much microwave energy as the cookie. As an approximation, for a 750-Watt microwave oven, the cookie will absorb $P_A$=29%×750=210 Watts and the syrup will absorb $P_B$=71%×750=540 Watts—again causing a faster rise in temperature for the syrup.

3. The syrup is present in a smaller amount (about 16 wt. % of the Composition), and Equation (1) tells us that temperature rise is inversely proportional to mass—again causing a faster rise in temperature for the syrup.

In fact, if we use Equation (1) to calculate the estimated temperature rise of the two components, we get the following.

For the cookie (Component A):

$$\frac{dT_A}{dt} = \frac{C_{mA} P_A}{m_A} = \frac{0.031 \times 210}{14} = 0.47° \text{ C./s}$$

For the syrup (Component B):

$$\frac{dT_B}{dt} = \frac{C_{mB} P_B}{m_B} = \frac{0.14 \times 540}{2.6} = 29° \text{ C./s}$$

The ratio of temperature rise of the syrup compared to the cookie is 29÷0.47=63. In other words, the initial temperature rise of the syrup is about 60 times that of the cookie. That is how and why this invention works.

If all of the microwave energy being absorbed by the syrup (540 W) went into just heating the syrup—with no heat losses, evaporation, etc.—it would take less than 3 seconds at 29 degrees-per-second to heat syrup from its starting temperature of, say, 20° C. (68° F.) to its boiling point of about 101° C. (214° F.).

20° C.+(2.8 s×29° C./s)=101° C.

This rate, however, is not quite observed. Table 2 indicates that it takes about 5 seconds for the syrup to boil. The reason for the slightly longer time is that the absorbed microwave energy does not all contribute to temperature rise. As the syrup heats up, the following three processes (amongst others that are less significant) start to consume energy.
 (a) The vapor pressure of water increases exponentially as the temperature rises, causing evaporation from the upper surface, consuming energy in the form of the latent heat of vaporization. As the syrup approaches its boiling point, this dominates the heat loss from the syrup.
 (b) The hot upper surface of the syrup loses heat to the surrounding air, primarily by convective heat transfer.
 (c) The cookie is heating up at a much slower rate than the syrup, and the lower surface of the hot syrup transfers heat to the cookie below, primarily by conductive heat transfer.

As recorded in Table 2, the caramel syrup began to boil at about 5 seconds, rather than the 3 seconds it would take if the three heat losses above did not occur. This implies that roughly 60% of the microwave energy absorbed went into temperature rise, and 40% went towards heat losses, primarily by the three processes identified above.

As the syrup evaporates, and thereby contains fewer water molecules, it will see a decrease in the Watts of microwave energy it absorbs ($P_B$). By the time a little over one half of the syrup's water has evaporated, it will have about as much water content as the cookie, and they will each be absorbing about half of the 750 Watts. Accordingly, the temperature-rise ratio of 63 will continuously decrease as the process proceeds. Furthermore, once boiling begins, the temperature rise will be governed by the concentration of the syrup. A liquid that is free to boil cannot typically be heated above its boiling point, and any heat put into that liquid will be consumed by evaporation via the latent heat of vaporization. As the syrup boils, however, its concentration will rise further, and this will increase its boiling point further and further. Energy will predominantly be going towards evaporation, but also going towards temperature rise as the concentration increases.

The results in Table 2 can be used to put the Process in descriptive terms. By the time the cookie is starting to get warm (5 seconds), the syrup has already reached its boiling point of about 214° F. (101° C.). By the time the cookie is hot-to-touch (20 seconds), the syrup has boiled away most of its water and is above about 300° F. (150° C.), and some caramelization has begun in the hotter zones. This rapid and preferential heating of the syrup is by design, and is an essential part of this invention. If the ratio of Component B to Component A deviates too far from the exemplary ratio of 10 to 25 wt. % (all else being equal), the temperature-time profile of the two components will be altered, and a less optimal result will be achieved.

Cooling

If cooked beyond a doneness of "medium", cooling for 1 to 2 minutes is recommended to avoid burning the mouth. Prior to such cooling, even though the cookie may be cool enough to handle (well below 200° F./95° C.), the syrup layer may be quite elevated in temperature—250 to 320° F. (120 to 150° C.). Longer cooking times can result in a flimsy cookie that will break apart if not cooled for at least 2 to 5 minutes; however, eating them carefully while piping hot and "gooey" can be pleasurable too.

The cookies so produced retain a full pleasant fresh-baked taste, smell and mouth feel for at least 30 to 60 minutes, and substantially so for up to a few hours. The change in taste and mouthfeel profile with cooling time is presented in Table 3 for cookies that were prepared to a "medium-well" state of doneness (note, descriptions are subjective).

TABLE 3

Change in taste profile with cooling time.

| Cooling time | Description |
| --- | --- |
| 1 min | Hot, gooey and chewy, flimsy but manageable and delectable |
| 2 min | As above, but not as hot and more structural integrity |
| 5 min | Warm, and a little chewier, chocolate still softly melted |
| 10 min | Close to ambient temperature, a little crunchier, flavor and mouthfeel excellent, more like a fresh-baked rack-cooled cookie. |
| 20 min | Ambient temperature, still excellent quality, chocolate chips still soft. |
| 30 min | Same, with chocolate chips still slightly soft. |
| 1 hr | Partial loss of chewiness and crunch but still fresh, chocolate chips still slightly soft. |
| 2 hrs | Moderate loss of chewiness and crunch, flavors still good, chocolate still somewhat soft, some fresh-baked characteristics. |
| 4 hrs | Characteristics of a regular "baked today" chocolate chip cookie but with an added crunchy toffee component. |
| 10 hrs | Some further softening of the toffee. |
| 16 hrs | Soft toffee, fresh taste, no longer fresh-baked, but overall satisfaction still far better than the original store-bought cookie. |

Comparison with Conventional Baking

When a chocolate-chip cookie is baked on a tray in an oven, it typically takes 9 to 11 minutes at 350° F. (180° C.). The bottom surface of the cookie gets the hottest, for the following reason. In a conventional gas or electric oven, heat rises from the heat-source at the bottom of the oven and transfers to the bottom of the baking tray, from where it is conducted up into the bottom surface of the cookie. From there, the heat transfers upwards, through the cookie, to the cooler upper-surface of the cookie, heating the bulk of the cookie as it does so. The upper surface receives some heat transfer from the hot air in the oven; but evaporation of water as part of the cooking process cools the upper surface significantly, keeping its temperature well below that of the bottom surface. For this reason, most caramelization and other chemical transformation processes occur on the bottom of the cookie. The results of these transformations give the cookie its fresh-baked taste, smell and mouthfeel. Unfortunately, the chemical and physical structures and flavors break down with time, losing that fresh-baked appeal in a matter of hours.

The opposite temperature gradient happens in the current invention. The bottom surface of the cookie sits on a microwave-safe plate at ambient temperature. Microwaves heat the cookie more-or-less evenly (in a bulk sense), and some of that heat transfers down to the cooler plate (paper, plastic or ceramic) and potentially through to the bottom of the microwave oven (typically either a metal floor or a glass tray), making the bottom surface the coolest part of the cookie. The syrup layer on the top of the cookie heats much more rapidly. Within 5 seconds or so, it is boiling, and within 20 seconds or so, it is approaching "baking temperatures" of over 300° F./150° C.—exposing the upper surface of the cookie to such temperatures. In the present invention, the caramelization and other chemical transformation processes associated with baking occur at the top surface of the cookie, where elements of both Component A and Component B may be caramelized or otherwise transformed. Once cooled and tasted, however, the inverting of the temperature gradient from bottom-up to top-down makes no difference to the human taste experience. As a side benefit, the cooling effect of the plate on the bottom surface helps the cookie retain more structural integrity, and accelerates the post-cooking cooling process.

One of the primary benefits of the present invention is that a single cookie can be prepared in a fraction of the time of fresh-baked cookies. Table 4 compares the preparation, cooking and cooling times for fresh-baked cookies with those for an individual cookie prepared according to the present invention. Note, when baking cookies in the conventional way, it takes almost as long to produce a single cookie as it does to make a few dozen, rendering single-cookie preparation impractical.

The present invention is best suited to preparing one or two cookies at-a-time (totaling 10 to 40 grams) when using a domestic microwave oven rated at 600 to 1,200 Watts. If more are prepared in a batch (for example, 2 large cookies totaling 60 grams) the longer cooking time produces less heat differential between the syrup and the cookie, and the desirable effects are diminished. If two cookies are desired, it is better to cook them singly, one after the other, than to cook them together for twice as long.

TABLE 4

Time comparisons for cookie production.

| Time | Baked cookies from scratch (min) | Baked cookies from pre-made cookie dough (min) | The present invention (min) |
|---|---|---|---|
| Preparation time | 10-20 (avg 15) | 3-5 (avg 4) | 0.5-0.75 (avg 0.6) |
| Cooking time | 9-11 (avg 10) | 9-11 (avg 10) | 0.25-0.5 (avg 0.4) |
| Tray cooling time | 1-5 (avg 3) | 1-5 (avg 3) | 0-3 (avg 15)* |
| Wire rack cooling time | 5-15 (avg 10) | 5-15 (avg 10) | 0 (avg 0)* |
| Total time for preparation and cooking (minutes) | 19-31 (avg 25) | 12-16 (avg 14) | 0.75-1.25 (avg 1) |
| Total time including cooling time (minutes) | 25-51 (avg 38) | 18-36 (avg 27) | 0.75-4.25 (avg 2.5) |

*The cookie is on a plate that does not get significantly hot, and it does not get transferred to a wire rack.

With a total preparation-and-cooking time of about 1 minute, the present invention lends itself to fast-food outlets and coffeeshops, where the cooling time (a few minutes) can pass by while the customer is completing the checkout process, and the cookie can either be consumed immediately in a hot and gooey state, or saved until other savory food items have been consumed and then eaten with an excellent fresh-baked taste, smell and mouthfeel.

Deviations from the Exemplary Composition and Process

To understand the range of optimal compositions and process parameters, consider the main parameters that define the exemplary embodiment.

The five parameters defined in Table 5 result in the syrup attaining the benchmark temperature of 300° F. in 17.6 seconds. This time was derived by fitting Equation (1) to the parameters and results in Table 1 and Table 2 using standard engineering heat and mass transfer principles. The model so developed allows easy exploration of modifying the parameters in Table 5.

TABLE 5

Exemplary composition and process parameters

| Parameter | Value |
|---|---|
| 1. Microwave power | 750 W |
| 2. Weight of cookie | 14 g |
| 3. Moisture content of cookie | 3 wt. % |

TABLE 5-continued

Exemplary composition and process parameters

| Parameter | Value |
|---|---|
| 4. Weight of syrup | 2.6 g |
| 5. Content of syrup | 60 wt. % Sugars |
| Resulting time to attain 300° F. | 17.6 s |

Parameter 1—Microwave Power

Equation (1) shows that microwave power has a more-or-less linear relationship with total mass of composition (Parameters 2 and 4), all else being equal. So, for example, if the microwave power is doubled, and the weights of cookie and syrup are each doubled as well, the time to attain 300° F. will remain at approximately 17.6 s. If, on the other hand, the weights are kept constant and the microwave power is doubled, and the time to attain 300° F. will be halved to approximately 8 s. In most situations, the microwave power level available is set by the equipment at hand, and is prescriptive of the weight of cookie and syrup that can reach the benchmark temperature in a convenient time frame of, say, 15 to 25 seconds.

Parameter 2—Weight of Cookie

The present invention lends itself to preparing a single serving. Increasing the number of cookies or weight of cookie to be prepared at one time eventually decreases the quality of the outcome. Results for enhancing one, two and three 14-gram cookies in a 750-Watt microwave oven are shown in Table 6.

If the mass of Composition to be enhanced via the Process of this invention is increased, the ramp-up in temperature of the syrup layer is slowed, allowing more time for heat transfer into the cookie. This means that the base cookie, Component A, can become overcooked before the syrup layer, Component B, has reached the desired concentration and desired high temperature. If the desire is to heat a larger initial portion (say, a 40-gram or 50-gram cookie), a microwave oven with a higher power output should be used. A 1,200-Watt microwave (the typical maximum for domestic use) should handle two 14-gram cookies (or one 30 g cookie) with excellent results, or 3 14-gram cookies (or one 40- to 50-gram cookie) with reasonable quality. A 2,000-Watt microwave (typical maximum for small-business commercial use) should handle 40 to 60 grams of cookie with excellent results, and may need its power output to be throttled for 30 grams or less.

Parameter 3—Cookie Moisture

Cookie moisture is one of the most important parameters. For any cookie to be a good candidate to use as Component A of this invention, it's moisture content must fall within certain ranges. Table 7 shows moisture contents for a selection of commercially available cookies.

TABLE 7

Moisture content of some commercial cookies

| Sample | % Moisture |
|---|---|
| Pepperidge Farm ® Farmhouse Thin & Crispy Dark Chocolate Chip[1] | 3.0 |
| Keebler ® Chips Deluxe Cookie[2] | 3.4 |
| Nabisco ® Chips Ahoy Cookie[2] | 3.9 |
| Keebler ® Sandees Pecan Shortbread Cookie[2] | 4.7 |
| Archway ® Gingersnap Cookie[2] | 6.8 |
| Archway ® Homestyle Sugar Cookie | 8.4 |
| Nabisco ® Nutter Butter Soft Cookies | 11.7 |
| Archway ® Oatmeal Raisin Cookie[2] | 12.6 |

Sources:
[1]This study;
[2]U.S. Pat. No. 6,093,437, Katta et al.

As can be seen in Table 7, moisture contents in cookies can range from 3 wt. % or less to 12 wt. % or more. Higher-moisture cookies sometimes bear descriptors such as moist or soft. Lower-moisture cookies sometimes bear descriptors such as crispy or crunchy. The cookie used in the preferred embodiment of this invention is one of the less-moist chocolate chip cookies on the market, having about 3 wt. % water.

If more water is present in the cookie, all else being equal, more of the microwave energy will go towards heating up the cookie, and less will go to heating up the syrup. Example results from modelling of the Process are shown in Table 8.

TABLE 6

Effect of increasing the weight of cookie to be prepared

| Cookies | Total cookie weight | Total syrup weight | Time for syrup to begin boiling | Time until cookie(s) begins to burn | Quality just prior to onset of burning | Consistency of syrup layer just prior to onset of burning |
|---|---|---|---|---|---|---|
| 1 | 14 g | 2 g | 5 sec | 30 sec | Excellent | Chewy with toffee crunch |
| 2 | 28 g | 4 g | 9 sec | 40 sec | Good | Chewy and soft |
| 3 | 42 g | 6 g | 14 sec | 50 sec | Fair | Thick syrup |

TABLE 8

Effect of cookie moisture on outcome

| Moisture Content of Cookie (wt. % water) | Time to Reach 300° F. in Syrup | Cookie Temperature at that time | Cookie Temperature Rise Above Ambient (68° F.) |
|---|---|---|---|
| 3% | 18 sec | 98° F. | 30° F. |
| 6% | 28 sec | 128° F. | 60° F. |
| 9% | 39 sec | 162° F. | 94° F. |

As can be seen in Table 8, when compared to a cookie with 3 wt. % water, one with 9 wt. % water takes more that twice as long to attain the benchmark syrup temperature of 300° F., and by the time it does, the cookie temperature rise (above ambient) is more than 3-times greater. The resultant final product takes longer to produce, and will need far longer to cool down prior to handling. Furthermore, most experiments with high moisture-content cookies (>6 wt. %) as Component A resulted in soggy cookies with poor structural integrity. Cookies with less than 6% moisture produced good results, with the best results occurring with cookies containing less than 4 wt. % water.

A good indication that a base cookie has too much moisture is that it takes longer than 30 seconds to reach the benchmark temperature of 300° F., which can be approximately determined by the presence of noticeable caramelization in the syrup layer. It is preferrable that the time to reach 300° F. be 20 seconds or less.

Parameter 4: Weight of Syrup

In the exemplary embodiment, 2.6 g (2 ml) of syrup was used on a 14 g cookie, representing 16 wt. % syrup in the initial Composition. As already described, this means that more than two-thirds of the water is in the syrup, and less than one-third is in the cookie, meaning the syrup, initially, captures more than two-thirds of the microwave energy, as desired. Theoretically, the Process of the present invention will work if, say, half as much syrup is used. This will theoretically just decrease the time taken to reach the benchmark temperature of 300° F. by several seconds, as there is less syrup to heat. Similarly, doubling the amount of syrup will theoretically just increase the time by several seconds.

There is, however, a practical range for the amount of syrup to use for a given amount of cookie. This practical limitation derives primarily from the volume of the syrup and the upper surface-area of the cookie. In preparation of the initial composition, with reference to FIG. 2, the syrup 201 (Component B) is spread on the upper surface of the cookie 202 (Component A) in a more-or-less even layer, leaving a zone 203 around the perimeter that is uncoated. During the microwave heating Process, the syrup heats up rapidly, becoming far less viscous as it does so, and begins to flow outwards into this uncoated zone. It then begins to boil profusely, resulting in further lateral migration into this zone. If not for the uncoated zone, which, in the exemplary Composition might be, say, about 1 cm wide, a significant portion of the syrup would flow off the cookie onto the plate, rendering it ineffective in the Process as well as rendering it absent from the final Composition. As it is, even with the 1 cm uncoated zone, some (less than, say, 10%) of the boiling syrup will end up on the plate. Minor losses such as this are expected and are acceptable.

In the case of using 2 ml (2.6 g) of syrup on a cookie with an average diameter of 6.8 cm and an average height of 0.8 cm (or 12% height-to-diameter ratio), leaving an uncoated zone about 1 cm wide around the perimeter, the coated area will be about 20 cm$^2$, resulting in a syrup thickness of about 0.1 cm or 1 mm. This is ideal. If half as much syrup, 1 ml (1.3 g or 8.5 wt. % of the Composition), is used, the layer of syrup is so thin that it can scarcely be spread over the desired area, and there is not enough lateral migration into the uncoated zone to cover the entire cookie during the microwave heating Process. If twice as much syrup, 4 ml (5.2 g or 27 wt. % of the Composition), is used, the initial thickness of syrup is about 2 mm, and it immediately begins to flow out into the uncoated zone. During the microwave heating Process, close to half of the syrup will flow of the edge of the cookie and onto the plate, rendering it ineffective in the overall Process, and eliminating it from the final Composition.

The exemplary cookie had a height-to-diameter ratio of 12%, and the cookies in Table 7 (as with most cookies) had ratios in the range 8% to 16%. In practice, with a high-viscosity syrup (say, >2,000 mPas), the amount of syrup for a cookie in this height-to-diameter range should be greater than 10% and less than 25%, and preferably should fall in the range 12 to 20%. For different viscosities, or for pastes or gels as Component B, and for cookies with atypical height-to-diameter ratios, this range can be easily adjusted by experimentation.

Parameter 5: Content of Syrup

The exemplary embodiment utilized a syrup as Component B with about 60 wt. % sugars and about 40 wt. % water. Other minor components included dairy fats, lecithin, salts and flavors, present at less than 1% by weight.

Viscosity values for common liquids are readily available, and some common substances are listed in Table 9 for reference. The viscosity of Component B should be high enough that it stays in place for several seconds or more while the cookie is placed in the microwave oven. With reference to the substances in Table 9, Component B should be at least as viscous as maple syrup (200 mPas), and preferably as viscous as honey or corn syrup (2,000 mPaS). In the exemplary embodiment, Component B had an estimated viscosity of 5,000 to 10,000 mPas.

TABLE 9

Viscosities of common substances.

| Substance | Viscosity, mPas |
|---|---|
| Water | 1 |
| Blood | 10 |
| Maple Syrup | 200 |
| Castor Oil | 500 |
| Glycerin | 1,000 |
| Honey or Corn Syrup | 2,000 |
| Molasses | 5,000 |
| Chocolate Syrup | 10,000 |
| Ketchup | 50,000 |
| Lard or Crisco | 1,000,000 |

It is also important that as the syrup heats up to its boiling point, it remains sufficiently viscous that it does not flow off the sides of the cookie to too great an extent. Some such lateral losses (e.g., <20%) are acceptable.

The exemplary syrup contained about 40 wt. % water and 60 wt. % Sugars. Many commercial syrups contain more water, less sugar, and significant amounts of thickeners, such as starches. While the Process of the present invention will work with, say, 50 wt. % water and 50 wt. % Sugars, any Sugar concentration below about 40 wt. % (resulting in 60 wt. % water) begins to have two deleterious effects. Firstly, the viscosity is so low it presents problems with some of the syrup flowing off the cookie during the Process, and too much syrup wicking into the porous cookie, rendering it soggy. Secondly, as more water has to be boiled off and there is less sugar, the cooking time increases, and the sweetness of the final composition is decreased.

It is noteworthy that the syrup used in the exemplary embodiment contained no thickeners such as starches. This is ideal. Thickeners do not contribute to the colligative property of boiling point elevation that results in the syrup attaining the desired high temperatures as it boils. Also, as the syrup boils and climbs above 250° F., any starches cook and become caky, and their flavor notes detract from the desirable caramelization of a starch-free syrup.

Production of Enhanced Cookies for Storage and Later Consumption

Cookies produced by the current invention do not need to be consumed immediately. If cooked until at least medium-well-done, they will have a low-enough water content that they may be cooled and stored for later consumption. The addition of more sugar and caramel along with further caramelization adds a new element of flavor and texture, including a toffee element at longer Processing times. The resultant product is in fact different to the original cookie, and if stored in a cool dry place for days or weeks, it will not return to the original cookie. It is a new food Composition, one which cannot be produced in a single baking process in a conventional oven. Such shelf-stable cookies could be intentionally produced in a 2-step process whereby 1) the base cookie is baked and cooled/dried to an appropriate moisture content, and 2) the present invention is used in a second step to produce the final result. Many people will find it a superior cookie product in every way—both when first produced and even after cooling and storage.

Other Considerations

Other base cookies and syrups have been tested, including the examples listed in Table 10 (note, result descriptions are subjective). Examples that produced less-favorable results included: strudel with apple syrup; oatmeal cookie with molasses; peanut-butter cookie with honey; chocolate chip cookie with simple syrup (i.e., white sugar syrup).

Every combination of cookie and syrup needs experimentation to optimize cooking time for each level of doneness. Once optimized, base cookies could be sold retail along with syrup in a dispenser (such as a tube or pump) or measured packets of syrup (like condiment packets) and instructions on optimal microwave times for any given doneness. Fast food outlets could buy or bake the base cookies, and have a metered hand-pump bottle to dispense the optimal amount of syrup.

A variation of the present invention that can deliver an even more desirable result is one where Component A itself has two discrete components, Component A-1 and Component A-2. Component A-1 refers to what has been heretofore referred to as Component A, exemplified by a low-moisture-content chocolate chip cookie. Component A-2, which is the new element being introduced in this variation, is any food component, preferably with moderate to low moisture content, that can add flavor or texture to the Composition. Examples of exemplary Component A-2 foodstuffs are chocolate chips, toffee chips, mini-marshmallows, nuts, or dried fruits. In order to be effective, Component A-2 foodstuffs should have a moisture content less than 20 wt. %, and should comprise no more than 30 wt. % of Component A. The following is an exemplary embodiment of this variation.

Component A-1: a 14-gram chocolate chip cookie containing 3 wt. % water.

Component A-2: 4 to 6 large dark-chocolate chips, totaling 1 gram in weight, containing less than about 3 wt. % water.

Component B: 2 ml (2.6 grams) of thick caramel syrup with 40 wt. % water.

In this example, the chocolate chips could be arranged on top of the chocolate chip cookie to assemble the full embodiment of the new Component A, and then the syrup (Component B) could be drizzled over it. The process would be ostensibly the same as it would be if the chocolate chips (Component A-2) were not present, as has been previously described. The small amount of low-moisture-content chocolate chips barely interferes with the Process or with the temperatures attained in Components A and B. The result, however, is an enhanced cookie as before; but now containing significantly more dark chocolate in a semi-molten state—a result that many consumers will find significantly superior.

The addition of any number of Components A-2 in such a fashion are foreseen in the present invention, and fall within the scope of the present invention.

COMMERCIALIZATION CONSIDERATIONS

There are a number of ways the present invention could be commercialized, some of which separate the steps of

TABLE 10

Comparison of different chocolate-chip cookies and syrup types/amounts

| Cookie | Syrup | Microwave Time | Quality of Result |
| --- | --- | --- | --- |
| 14-gram "crispy" Pepperidge Farm | 2.5 ml Smuckers Butterscotch | 25 sec | Fantastic |
| Same | 2.5 ml Smuckers Butterscotch | 20 sec | Excellent |
| Same | 1 ml Torani Caramel | 20 sec | Good but uneven |
| Same, but cookie upside down | 1.5 ml Torani Caramel | 20 sec | Excellent |
| 35-gram "soft baked" by Franz | 5 ml Torani Caramel | 35 sec | Fair (soft/fragile) |
| 11-gram "original" by Chips Ahoy | 1.5 ml Torani Caramel | 20 sec | Fair |
| 16-gram "chewy" by Chips Ahoy | 2 ml Torani Caramel | 25 sec | Mediocre | preparing the Composition and performing the Process of microwave heating. Examples are described below.

Example 1: Restaurant or Fast-Food Establishment

In this setting, the likely commercial process is that: 1) a customer orders an enhanced cookie of the present invention selecting from a menu of cookies (Component A-1), optional toppings (Component A-2), syrups (Component B) and levels of doneness; 2) an employee prepares the Composition by spreading, for example, caramel syrup on a chocolate chip cookie with extra dark-chocolate chips; 3) said Composition is promptly heated in a microwave oven until the desired doneness has been achieved; and 4) the enhanced cookie so produced is cooled briefly and served to the customer. In this example, the combined Composition and Process of the present invention is prepared and performed in its entirety, in quick succession, by a single entity (a business with employees).

Example 2: Retail Sales of Both Components

In this method of commercialization, cookies suitable for Component A and syrup suitable for Component B could be packaged together (with or without a Component A-2) for retail sale. The syrup could be pre-packaged in small packets containing the optimal quantity for a single cookie. Alternately, the syrup might be in a squeeze-tube with instruction on how much to dispense for a single cookie. Instructions could be provided for microwave cooking times needed to produce the final Composition at various levels of doneness for various microwave power levels. In this example, the commercial opportunity lies in selling the two required components along with instructions on how to assemble the Composition, at home or elsewhere, and how to perform the Process. The instructions might be in the form of printed materials, or might be QR codes or references to web pages containing such directions. In this scenario, the selling of the two components packaged together without any such directions, or access thereto (whether it be direct or indirect), might not necessarily be practicing the present invention.

Example 3: Retail Sales of One Component

In this method of commercialization, either cookies suitable for Component A or syrup suitable for Component B could be sold as an individual item. Instructions could be provided for suitable purchase options for the missing second component (and an optional Component A-2), as well as for the optimal ratios of components for preparation of the Composition, as well as microwave cooking instructions for the Process. In this example, the commercial opportunity lies in selling the one required component along with instructions on how to procure the second component, how to assemble the Composition, and how to perform the Process. The instructions might again be in the form of printed materials or web pages. In this scenario, the selling of a single component without any such directions, or access thereto (whether it be direct or indirect), would not be practicing the present invention.

Example 4: Monetization of the "Recipe"

The following is one of many variations of this method of commercialization. A website (and its owner), which may earn revenue from advertising on the website, might provide links to suitable products for sale on other websites, said products being ideal for the Components A and B, said links possibly generating "click" revenue for the website. The website might also provide guidance for "brick and mortar" purchase options for the two components. The website could furthermore provide knowledge of the optimal ratios of components for preparation of the Composition; as well as knowledge of the microwave cooking instructions for the Process. In this example, the revenue opportunity lies in the selling of ads on the website or through revenue-generating links to other commercial websites. In order to be practicing the present invention, the web site would need to be providing links to or direction on where to procure the two components, how to assemble the Composition, and how to perform the Process. In this scenario, the monetization of the separate compositional products alone, without all necessary further directions, or access thereto, would not be practicing the present invention.

NUTRITIONAL CONSIDERATIONS

The exemplary embodiment combines a 14-gram cookie having 70 dietary calories with 2 ml of syrup having 10 calories, for a total of 80 calories, representing a modest treat from a dietary perspective. Low-calorie cookies, that might otherwise be unappealing, may be enhanced significantly by this invention with the addition of only 10 extra calories.

I claim:
1. A process for preparing a candy-coated cookie, comprising:
   coating the upper surface of a cookie with a sugar syrup, wherein the cookie has an initial moisture content of less than 6 wt % water, and wherein the syrup has an initial concentration of at least 40 wt % sugars, and wherein the syrup makes up between 10% and 25% of the initial weight of the syrup-coated cookie;
   placing the syrup-coated cookie in a microwave oven with a microwave power level of at least 20 Watts per gram of syrup-coated cookie;
   heating the syrup-coated cookie in the microwave oven until the syrup reaches its boiling temperature and begins to boil; and
   continuing to heat the syrup-coated cookie in the microwave oven until the syrup has boiled for 10 to 25 seconds, causing the syrup to attain a temperature of 250 to 350° F. thereby transforming it into a non-flowable coating of candy on top of the cookie.
2. The process of claim 1 wherein the moisture content of the cookie is less than 4 wt % water.
3. The process of claim 1 wherein the syrup is a sugar syrup, gel or paste comprising one or more of sucrose, glucose, fructose, invert-sugar, high-fructose corn syrup or other saccharides.
4. The process of claim 1 wherein the syrup comprises more than 50 wt % concentration of sugars.
5. The process of claim 1 wherein the syrup makes up between 12% and 20% of the syrup-coated cookie by weight.
6. The process of claim 1 wherein the syrup has a fluid viscosity greater than 2,000 mPas.
7. The process of claim 1 wherein the average height of the cookie is between 8% and 16% of its average crosswise dimension.
8. The process of claim 1 wherein the temperature attained in the syrup during the microwave heating process is between 270 and 340° F.

9. The process of claim 1 wherein the cookie is topped with one or more of dried fruits, nuts or confectionaries prior to being placed in the microwave oven.

10. The process of claim 1 wherein the microwave input power-to-weight ratio is at least 40 Watts per gram of syrup-coated cookie.

11. A process for preparing a candy-coated cookie, comprising:
   1) coating the upper surface of a cookie with a sugar syrup, wherein the cookie has an initial moisture content of less than 4 wt % water, and wherein the syrup has an initial concentration of at least 50 wt % sugars, and wherein the syrup makes up between 12% and 20% of the weight of the syrup-coated cookie;
   2) placing the syrup-coated cookie in a microwave oven with a microwave power level of at least 40 Watts per gram of syrup-coated cookie;
   3) heating the syrup-coated cookie in the microwave oven until the syrup reaches its boiling temperature and begins to boil; and
   4) continuing to heat the syrup-coated cookie in the microwave oven until the syrup has boiled for 10 to 25 seconds, causing the syrup to attain a temperature of 270 to 340° F. thereby transforming it into a non-flowable coating of candy on top of the cookie.

* * * * *